Dec. 10, 1929.         W. S. ADAMS         1,739,341
BRAKE ROD
Filed Aug. 7, 1926
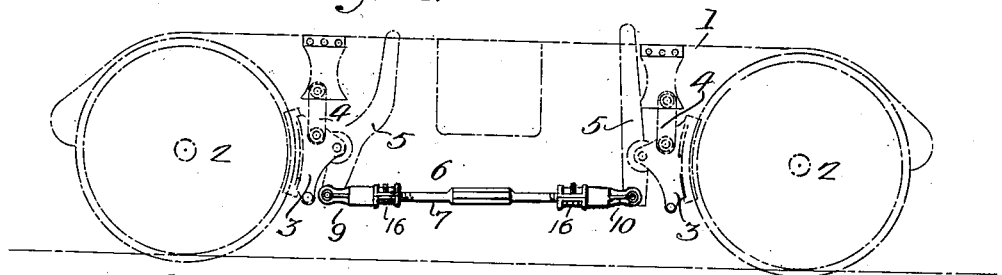
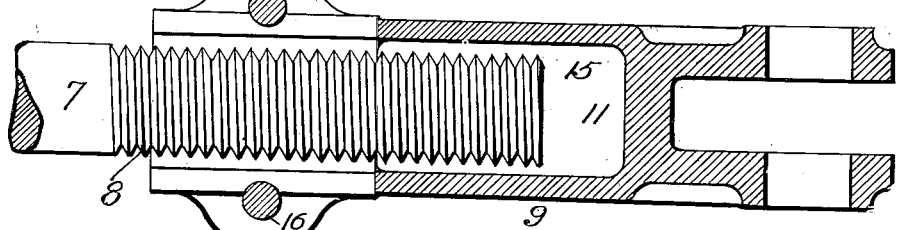
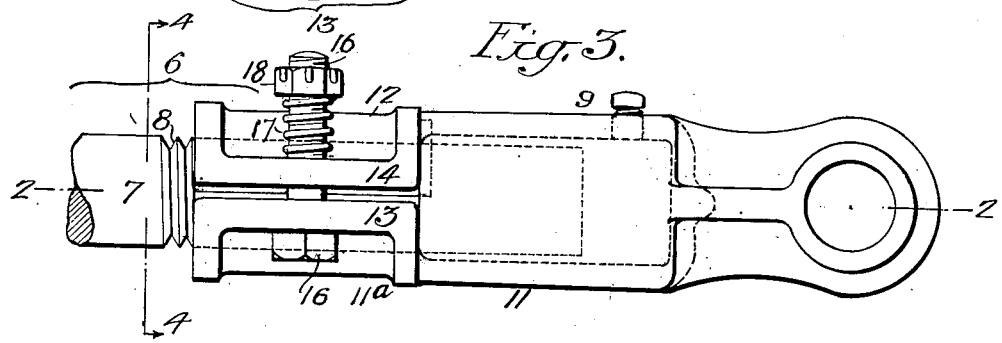
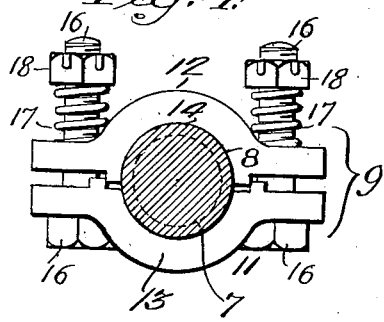
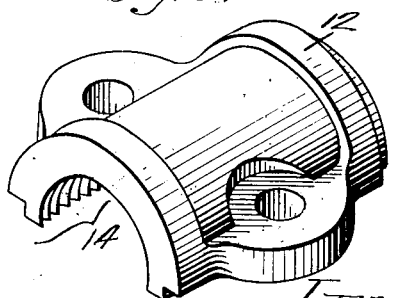
Inventor:
Walter S. Adams,
by his Attorneys.

Patented Dec. 10, 1929

1,739,341

UNITED STATES PATENT OFFICE

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

BRAKE ROD

Application filed August 7, 1926. Serial No. 127,923.

My invention relates to certain improvements in brake-rods that connect two levers of a railway brake mechanism.

The object of the invention is to provide a frictional clamping means for holding the brake-rod in the heads after adjustment, to overcome wearing of the parts, to hold the rod in perfect alignment at all times, and to allow the rod to be adjusted by a wrench without changing the tension of the springs which clamp the parts together.

In the accompanying drawing:

Fig. 1 is a side view, in dotted lines, of a railway passenger car-truck, showing the improved mechanism in full lines;

Fig. 2 is an enlarged sectional view of one head on the line 2—2, Fig. 3, showing the improved mechanism in full lines;

Fig. 3 is a side view of the head with the rod in position;

Fig. 4 is a transverse sectional view on the line 4—4, Fig. 3; and

Fig. 5 is a detached perspective view of the clamping member.

The frame 1 of a car-truck is shown in Fig. 1. 2—2 are the wheels of the truck. 3—3 are the brake-shoes, suspended from the frame 1 by links 4. The brake-levers 5, to which the brake-shoes are pivotally attached, are connected by a brake-rod 6, which is longitudinally adjustable to locate the brake-shoes in proper position in respect to the wheels.

In order to prevent the rod turning in its heads due to the vibration of the truck, frictional clamping devices are provided, which will hold the rod from turning accidentally but which will allow the rod to be turned by a wrench when necessary.

The rod 6 in the present instance consists of a central portion 7, threaded at each end as at 8, and heads 9 and 10 which have internal threads which mesh with the threaded ends of the rods. Each head is made in two parts, a body part 11 and a segmental clamping part 12. The body part 11 is recessed at one end, leaving a segmental portion 11ª. The segmental clamping part 12 is located in the recess. Each part has a screw-threaded portion 13 and 14, respectively, and when the parts are in position, the threads of the end 8 of the rod mesh with the threads of both parts of the head, as shown in Fig. 3. Back of the threaded portion of the part 11 is a cavity 15 for a lubricant which can be fed into the cavity through an opening closed by a suitable plug.

The clamping part 12 is yieldingly attached to the part 11 by bolts 16—16 which extend through openings in flanges on each part, and on these bolts are springs 17—17 which are confined between the frictional clamping part 12 and nuts 18 on the bolts. By adjusting the nuts more or less friction can be applied to the rod. The bolts are preferably located midway between the ends of the screw-threaded sections of the head, so that there is an even tension on the thread for its entire length. The two parts are so designed that their flanges are normally spaced apart as shown in Fig. 3, and in adjusting the clamping part 12 the nuts are turned, so that the springs are compressed and the clamping part bears against the threaded portion 8 of the rod 6. Then in order to allow the rod 6 to be turned, the nuts are backed off approximately a half-turn, so that while the springs permit the turning of the rod, the nuts are not turned to such an extent as to release the rod.

Prior to my invention, it was difficult to properly fit the threaded end of the rod in its head. The fitting of these parts has been comparatively loose, owing to the length of the threaded portion of the head. When the rod was under tension, as when the brakes are applied, the parts assume one position, and when the tension is released, the looseness of the thread allows the central portion of the rod to drop down due to the loose fit. The continual working of the parts quickly reduces the life of the rod.

By the above described invention, the parts are held in alignment at all times, and the rod is clamped under tension so that the use of jam nuts is unnecessary.

While one form of threaded brake-rod head is shown, the construction can be applied to a turn-buckle which is made with a right-hand thread in one end and a left-hand thread in the opposite end, without departing from the invention.

I claim:—

1. The combination in a brake mechanism, of a head made in two parts, comprising a recessed body part and a segmental clamping part having a portion fitting the recess of the other part; yieldable means holding the parts together; means for adjusting the tension of said yieldable means, each part having a screw-threaded section; and a rod having an external thread engaging the threaded sections of the head.

2. The combination in brake mechanism, of a head made in two parts, each part having a screw-threaded section; a rod having an external thread engaging the threads of the two parts of the head, the said parts having flanges at each side normally spaced apart when the two parts of the head are in contact with the threaded rod; bolts extending through the flanges; springs on the bolts; and nuts for compressing the springs.

3. The combination in a brake mechanism, of a rod having an external thread at one end; a head made in two parts, one part being recessed, and the other part fitting in said recessed portion, each part having a internal thread meshing with the external thread of the rod, the said parts having flanges at each side normally spaced apart when the two parts of the head are in contact with the threaded rod; and yieldable means holding the two parts together on the rod.

WALTER S. ADAMS.